Dec. 22, 1953  E. BUTTERWORTH ET AL  2,663,189
DRY GAS METER

Filed July 1, 1952  3 Sheets-Sheet 1

Inventors
E. Butterworth
E. J. Hinchcliffe
By Howson Downing Sebold Attys.

Dec. 22, 1953 E. BUTTERWORTH ET AL 2,663,189
DRY GAS METER
Filed July 1, 1952 3 Sheets-Sheet 2

Inventors
E. Butterworth
E. J. Hinchcliffe
By Stewart Downing Ruble Attys.

Dec. 22, 1953  E. BUTTERWORTH ET AL  2,663,189
DRY GAS METER

Filed July 1, 1952  3 Sheets-Sheet 3

Inventors
E. Butterworth
E. J. Hinchcliffe

Patented Dec. 22, 1953

2,663,189

UNITED STATES PATENT OFFICE 2,663,189

DRY GAS METER

Edward Butterworth and Eric John Hinchcliffe, Farnworth, England, assignors to Begwaco Meters Limited, Farnworth, near Bolton, England, a British company Application July 1, 1952, Serial No. 296,638
Claims priority, application Great Britain July 11, 1951

2 Claims. (Cl. 73—268)

1

This invention relates to dry gas meters and is particularly concerned with the arrangement of the gas transfer valves and passages and the mechanism by which such valves are operated, the improvement providing a compact and efficient meter.

The invention consists in a meter having two diaphragms operating flag rods disposed at diagonally opposite points in plan of the meter mechanism, each flag rod operating a gas transfer valve in such a way that the valve has a movement in an arc of a circle with the flag rod as its axis, and each valve being relatively long in a direction radial to the flag rod axis with its transfer passage in the said radial direction.

The invention further comprises coupling each valve to its flag rod by an arm which can turn freely about the flag rod and is connected to the valve by a pin or lug and by interengaging parts on valve and arm so that the valve moves with the arm, the latter being connected to a link coupling the crank shaft (which operates the meter index) to a flag arm which turns with the flag rod.

The invention further comprises disposing each diaphragm between two wedge shaped gas chambers, with the flag rod mounted at the narrow end of each pair of chambers and connected to the rigid parts between which the diaphragm is clamped and which hinges about the flag rod.

Referring to the accompanying explanatory drawings.

Figure 2:
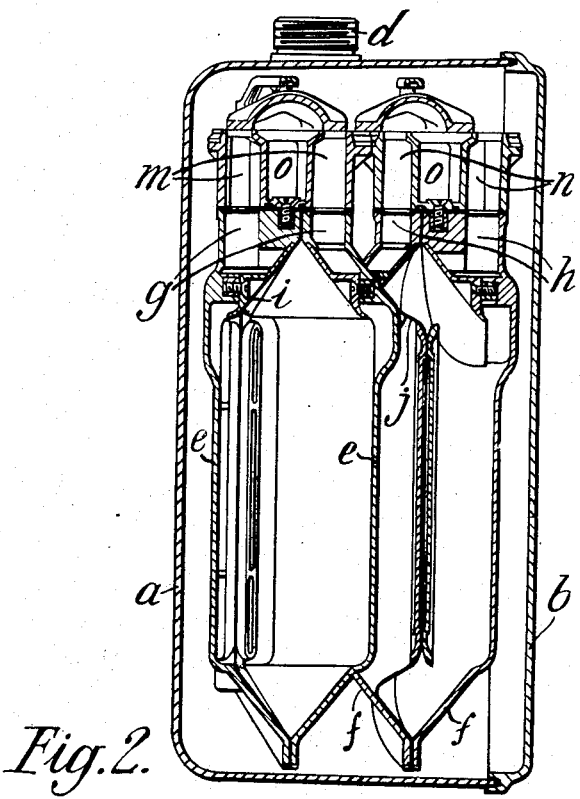
Figure 2 is a cross sectional view of the meter with the side cover in place.
Figure 4:
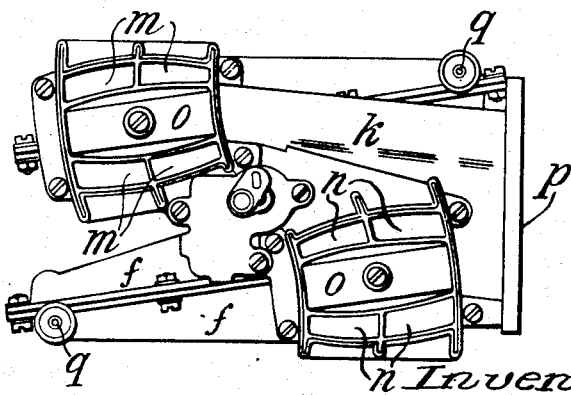
Figure 4 is a view showing the gas transfer ports but with the gas transfer valves and their operating mechanism (which are shown in Figure 3) removed.
Figure 6:
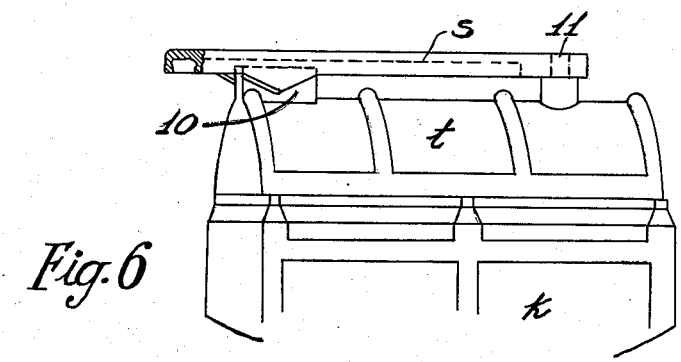
Figure 6 is a fragmentary view showing the connection between a valve and the arm by which it is operated.
Figure 5:
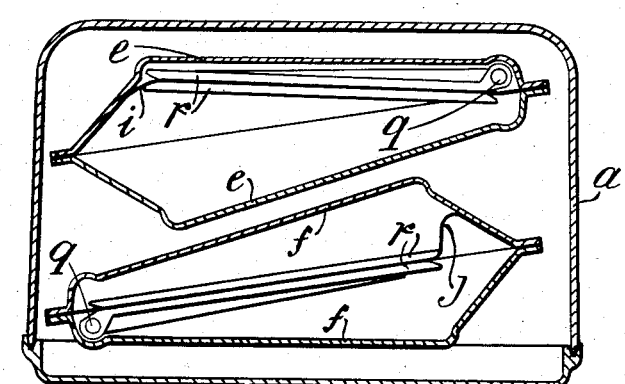
Figure 5 is a sectional plan view through the gas metering or diaphragm chambers.

The meter case comprises a body $a$ and a detachable side cover $b$ which makes a gas tight joint with the body. The gas inlet to the meter is at $c$ and the gas outlet at $d$. The fixed walls $e$, $f$ of the diaphragm chambers shown in Figure 5 are integral with a header above (see Figure 2) containing gas ports $g$, $h$ leading to and from the opposite sides of the diaphragms $i$ and $j$. The said header is secured to a manifold $k$ containing gas ports $m$ and $n$ in line with the ports $g$ and $h$, and also gas outlet passages $o$ leading to the flanged face $p$ of the manifold $k$ where it is connected to the meter case $a$ at the gas outlet branch $d$. The valve grids containing the ports $m$ and $n$ and $o$ are shown in Figure 4. The flag rods $q$ which are connected to the plates $r$ between which the diaphragms $i$ and $j$ are secured extend upwards and carry arms $s$ by which the gas transfer valves $t$ are constrained to move in the required directions as hereinafter described.

Figure 3:
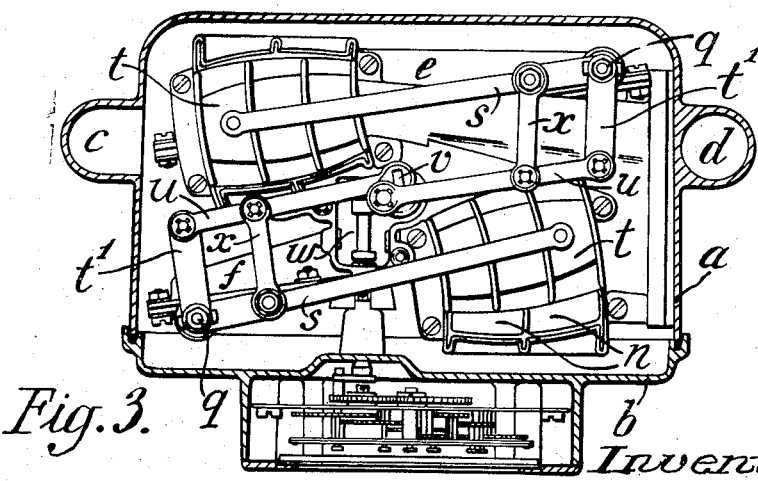
Figure 3 is a sectional plan view of the meter showing the gas transfer valves and their operating mechanism.

The whole of the meter interior is under gas inlet pressure, the gas inlet branch opening into the meter casing as shown in Figure 3.

Figure 1:
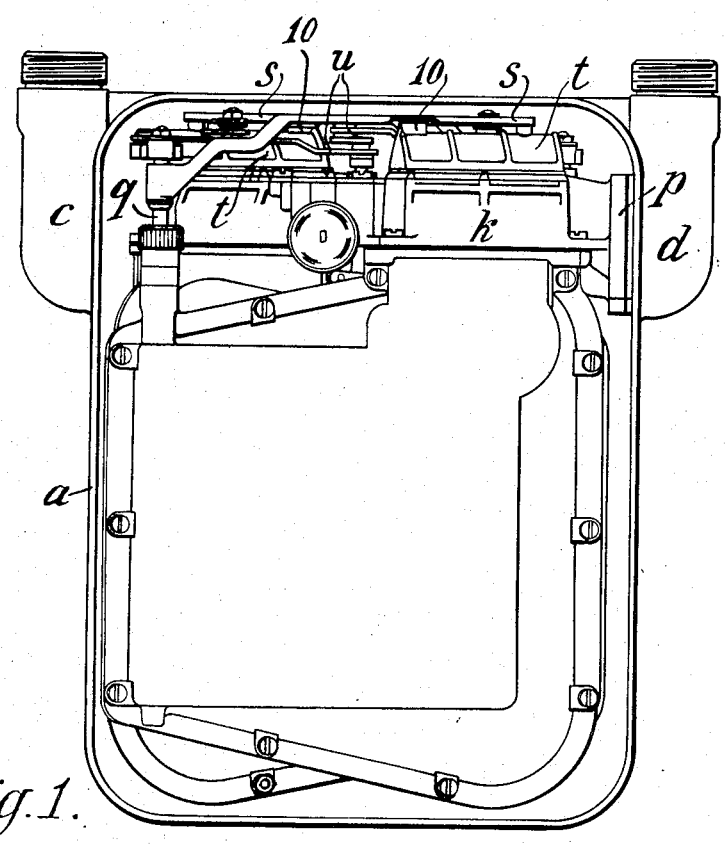
Figure 1 is an elevational view of a gas meter constructed in accordance with this invention with its side cover removed.

To the upper end of each flag rod $q$ is rigidly attached a flag arm $t^1$ to which is pivotally attached a flag link $u$, which at its outer or free end is coupled to one throw of a double throw crank shaft $v$ vertically mounted in a gear box $w$. The throws of the crank may be made adjustable as a means of ensuring accuracy of the meter readings. The arms $s$ are free to turn about the flag rods $q$ but are connected to the flag links $u$ by links $x$, the arms $t^1$ and links $x$ being of equal length and the distances between their pivotal connections to the arms $s$ being the same and links $u$ so that the links $u$ and arms $s$ move in a definite relationship. The arms $s$ are adapted as shown in Figure 1 to embrace and ride upon pads 10 on the backs of the valve $t$ and are anchored to pins or lugs 11 on the valves $t$ so that the valves must move with the arms $s$ as these turn about the flag rods $q$ due to their connection by the links $x$ to the links $u$. As the flag rods $q$ swivel about their axes and turn the double throw crank shaft $v$, the valves $t$ are moved sideways over the valve grids in the manifold $k$ and allow gas to pass from the interior of the meter case into one of each pair of diaphragm chambers whilst the other of each pair is delivering gas via its valve $t$ and the passage $o$ to the gas outlet branch $d$.

It will be noted that the diaphragm chambers are alike and symmetrical and are compactly fitted in the meter case so that the flag rods $q$ come to diagonally opposed corners of the metering unit.

The crank shaft $v$ is connected to the meter index mechanism as shown in Figure 3. If desired the meter may incorporate prepayment mechanism in any usual manner.

Excentric bushes may be incorporated in the connections between the links x and the links u and arms s to provide a means of adjustment of the valves or valve covers t with relation to the valve grids over which they are moved.

With our improvement, the valves t are guided and moved by the arms u and do not require extraneous guides such as are at present usual. The gas passages g, h, m and n are straight and do not cause back pressure on the gas passing through the meter. We thereby obtain an efficient meter which can be relatively economically produced.

What we claim is:

1. A dry gas meter comprising a case, gas inlet and outlet branches on said case, gas metering mechanism and index mechanism in said case, such metering mechanism comprising wall means forming two pairs of diaphragm chambers, a diaphragm between each pair of chambers, a flag rod extending vertically through each pair of chambers, a rigid part attached to each diaphragm and to a flag rod, transfer valves controlling the flow of gas into and out of each diaphragm chamber, the said two flag rods extending to a level above the transfer valves and being disposed at diagonally opposite points in plan of the metering mechanism, two arms each turning freely about a flag rod and connected to a transfer valve, a flag arm rigidly attached to each flag rod, a flag link pivotally connected to said flag arm at one end, a double throw crank shaft operatively connected to the index mechanism, the other end of each flag link being connected to a throw of said crank shaft, a link connecting each flag link at an intermediate point to an arm turning freely about a flag rod, and means on the back of each transfer valve making a second connection between the valve and the arm upon a flag rod so that the valve moves with the arm about the flag rod as an axis, the transfer port in the valve being long in a direction radial to the flag rod axis.

2. A dry gas meter comprising, in combination, a meter case consisting of a body and a detachable side cover making a gas tight cover with the body, gas inlet and outlet branches on the body, index mechanism carried by the cover, gas metering mechanism carried in the body, wall means forming two pairs of diaphragm chambers, a diaphragm between each pair of chambers, which are of wedge shape in sectional plan, a flag rod extending vertically through each pair of chambers at the narrow end thereof, a rigid part attached to each diaphragm and secured to the flag rod, headers below which the diaphragm chambers are supported, there being gas inlet and outlet ports through said headers communicating with the diaphragm chambers, a manifold to the underside of which the headers are attached, there being ports in said manifold in line with the ports in the headers and a gas outlet passage in the manifold leading to an end face of the latter where it is connected to the meter body at the gas outlet branch, two transfer valves, each for transferring gas from the interior of the meter body to a pair of diaphragm chambers and from the latter to the meter exhaust branch, the said two flag rods extending to a level above the transfer valves and being disposed at diagonally opposite points in plan of the metering mechanism, two arms, each turning freely about a flag rod and connected to a transfer valve, a flag arm rigidly attached to each flag rod, a flag link pivotally connected to said flag arm at one end, a double throw crank shaft operatively connected to the index mechanism, the other end of each flag link being connected to a throw of said crank shaft, a link connecting each flag link at an intermediate point to an arm turning freely about a flag rod, and means on the back of each transfer valve making a second connection between the valve and the arm upon a flag rod so that the valve moves with the arm about the flag rod as an axis, the transfer port in the valve being long in a direction radial to the flag rod axis.

EDWARD BUTTERWORTH.
ERIC JOHN HINCHCLIFFE.

References Cited in the file of this patent

UNITED STATES PATENTS

| Number | Name | Date |
| --- | --- | --- |
| 804,464 | Haas | Nov. 14, 1905 |
| 1,758,083 | Meyer | May 13, 1930 |

FOREIGN PATENTS

| Number | Country | Date |
| --- | --- | --- |
| 411,954 | Great Britain | June 21, 1934 |
| 422,810 | Great Britain | Jan. 18, 1935 |